(12) United States Patent  (10) Patent No.: US 9,467,523 B2
Cummings et al.  (45) Date of Patent: *Oct. 11, 2016

(54) SMALL FOOTPRINT NODE CONTROLLER CORE IN A GRID COMMUNICATIONS SYSTEM

(75) Inventors: John Cummings, Santa Maria, CA (US); Ming Qin, Oak Park, CA (US); Jonathan Dorny, Goleta, CA (US)

(73) Assignee: Control Point Corporation, Goleta, CA (US)

(*) Notice: Subject to any disclaimer, the term of this patent is extended or adjusted under 35 U.S.C. 154(b) by 351 days.

This patent is subject to a terminal disclaimer.

(21) Appl. No.: 13/525,185

(22) Filed: Jun. 15, 2012
(Under 37 CFR 1.47)

(65) Prior Publication Data
US 2015/0319219 A1  Nov. 5, 2015

Related U.S. Application Data

(60) Provisional application No. 61/497,515, filed on Jun. 15, 2011.

(51) Int. Cl.
*G06F 15/16* (2006.01)
*H04L 29/08* (2006.01)

(52) U.S. Cl.
CPC ........... *H04L 67/2823* (2013.01); *H04L 67/10* (2013.01); *H04L 67/1008* (2013.01)

(58) Field of Classification Search
None
See application file for complete search history.

(56) References Cited

U.S. PATENT DOCUMENTS

| | | | |
|---|---|---|---|
| 6,052,684 A * | 4/2000 | Du | G06F 9/52 |
| 7,251,669 B1 * | 7/2007 | Arora | G06F 17/30356 707/695 |
| 2004/0078105 A1 * | 4/2004 | Moon | G06Q 10/10 700/100 |
| 2006/0004675 A1 * | 1/2006 | Bennett | G06Q 10/10 705/402 |
| 2010/0011098 A1 * | 1/2010 | Sanborn | H04L 67/104 709/223 |

* cited by examiner

*Primary Examiner* — Wing F Chan
*Assistant Examiner* — Padma Mundur
(74) *Attorney, Agent, or Firm* — Barry N. Young

(57) ABSTRACT

A grid communication system provides distributed processing of business workflows. Each node has a core with a small footprint which provides control of business process and data flow and synchronization. The node controller communicates with applications and with other nodes through the use of messages. Messages are processed by the node controller according to a set of rules. The rules reside in a versioned repository. The rules may be set or modified through the use of messages from other nodes, allowing for enterprise control of individual nodes. The node controller includes a plurality of adapters for converting data and/or messages to and from formats for different applications.

17 Claims, 4 Drawing Sheets

SMALL FOOTPRINT NODE CONTROLLER CORE IN A GRID COMMUNICATIONS SYSTEM

BACKGROUND OF THE INVENTION

1. Field of the Invention

The present invention relates to grid-type information control in mobile systems. More particularly, it relates to a core for a controller of a node in a discontinuous network environment and to operation of the distributed system using a set of nodes having such a controller.

2. Discussion of Related Art

Mobile computing systems have many problems with data integrity and control across multiple nodes. One mechanism for maintaining control is described as a hub and spoke system. In this type of system, all data and processes are controlled from a central control. The nodes communicate with the central control to retrieve data, to communicate information with other nodes and to modify operations. For this type of system, all of the nodes must be connected to the central control. Loss of communication can result in erroneous data and performance.

Other systems seek to distribute control. In such systems, data and processes are stored locally at the nodes. Extensive communications are necessary to synchronize data between nodes. Additionally, if additional data becomes necessary at a node, processes cannot continue until the data is obtained. Even with these types of systems, process changes must come from a central control to coordinate operation of all of the nodes.

SUMMARY OF THE INVENTION

The present invention relates to a grid communication system having distributed processing and control. According to one aspect of the invention, the grid communication system is controlled through messaging and workflow. Each node on the communication system has designated workflow processes. When messages are received, the necessary workflow process is executed. According to another aspect of the invention, workflow processes can be changed through the use of messages.

According to another aspect of the invention, workflow for the entire system is distributed across nodes in the system. According to another aspect of the invention, nodes exchange messages to coordinate workflow. According to another aspect of the invention, nodes communicate messages in a point-to-point system. The workflows within a node identify associated nodes to which messages are to be sent. According to another aspect of the invention, workflow is organized as distributed processes in the nodes. Each node completes a portion of the workflow relevant to its operation and sends messages to other nodes necessary for other parts of the workflow.

According to another aspect of the invention, data is synchronized throughout the system through messaging. According to another aspect of the invention, data is integrated through messaging and workflow across applications. According to another aspect of the invention, the workflow includes processes for removing data from a node due to space constraints.

The present invention further relates to a node controller core for a grid communication system. According to one aspect of the invention, a communication system consists of a plurality of nodes, each node having a controller. The nodes communicate individually with other nodes in the system. The node controller operates to provide the communication between applications and nodes and to coordinate data storage. The node controller stores information relating to other nodes in the system with which the node operated by the controller can communicate directly.

According to another aspect of the invention, operation of the node controller is based upon a set of rules. The rules control the actions to be taken by the node as part of the workflow, the communications with other nodes, the storage of data, and modifications to operation of the node. Rules may be set within a single node. Alternatively, rules may be communicated from one node to another node, or from a central node.

According to another aspect of the invention, the node controller operates to provide synchronization of data between nodes on the communication system. According to another aspect of the invention, the synchronization of data is controlled by the rules operating the node controller. According to another aspect of the invention, data necessary for continued operation of a node when not connected to the communication system is stored at the node. The node controller maintains synchronization of stored data with other nodes on the communication system when it is online.

According to another aspect of the invention, the node controller controls the storage and maintenance of data for multiple applications. According to another aspect of the invention, a node controller includes a plurality of adapters for converting data to and from a common format to a plurality of proprietary formats for different applications. According to another aspect of the invention, the node controller core operates to validate and synchronize data and data formats. According to another aspect of the invention, the node controller maintains an audit trail for data in order to provide proper synchronization and translation. According to another aspect of the invention, data control is provided by rules stored in the node controller core. According to another aspect of the invention, data is transferred through the node controller core in the form of messages. According to another aspect of the invention, the rules provide business process flow for processing of messages.

DETAILED DESCRIPTION

The present invention provides processes for distributed processing and a core in each node for control of nodes in a grid-type mobile system. The distributed processing allows each node to operate independently and continue to function even when communications within the system are lost. In a grid-type communication system to which the present invention is applicable, communications are point-to-point between nodes on the system. Each node requires information regarding other nodes on the system with which it needs to communicate. The present invention provides a simple structure for storing information about nodes on the system to which a given node needs to communicate. The structure allows formation of the grid-type communication system with minimal data content on a given node.

The distributed processing is based upon data control. Data is distributed and synchronized within the system using communication of messages between nodes. The core of the present invention provides the basic operational setup for message and data control.

A difficulty in any communication system is failure of one or more communication links. If a node loses its links, it may not have access to information necessary to proceed with its operations. This causes loss of valuable time for a networked node. Data can be stored at each node for use when the communication system fails. However, conflicts may exist between nodes manipulating the same information. Also, creating multiple copies of information greatly increases the necessary space on each node. The present invention resolves these issues by providing a mechanism for determining data necessary for ongoing operation of the node in the event of a communication failure. The system further provides for rapid synchronization of data within a node once communications links have been reestablished.

The operation of each node in a communication system according to an embodiment of the present invention is controlled by a node core. The node core includes a driver and a rules repository. The rules repository stores rules relating to operation of the node. The system is easily adaptable through modification of rules in the repository. The rules may be modified through direct change or through receipt of certain messages relating to the rules. Thus, the rules are also treated as data within the node. According to an embodiment of the invention, the rules repository includes information relating to versions of rules. It can determine different versions of rules provided over time. This allows rules to be distributed throughout the system through the messaging techniques without loss of integrity of the system and without delays in ongoing operations of the nodes and system as a whole. According to another embodiment of the system, rules can be conditional and/or separated by namespaces. Different rules may be applied based upon additional information within the messages received.

Figure 1:
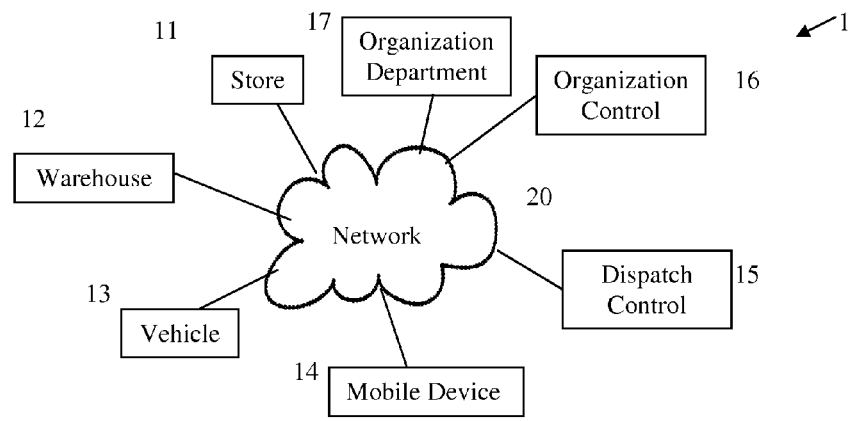
FIG. 1 is a block diagram illustrating a grid-type communication system in a mobile system.

According to an embodiment of the invention, a system 1, to which the node control of the present invention can be applied, includes a plurality of nodes 11-16 as illustrated in FIG. 1. Nodes may be of any known type within an organization or enterprise which require coordination and communication. As illustrated in FIG. 1, some nodes 11, 12 may be stationary, such as stores, warehouses, or other facilities at specific locations. Other nodes 13, 14 may be mobile, such as vehicles or handheld devices. Another node 15 (or multiple nodes) may provide dispatch control of the mobile nodes 13, 14. An enterprise or organization operates as a plurality of nodes within the system. The organization may have a control node 16 communicating with the individual nodes of the system. Subsystems of the organization, such as finance, accounting, auditing, manufacturing, and inventory control, may be individual nodes 17 on the system. All of the nodes are connected through a network 20. The network 20 may be of any type which allows communication between nodes. The network 20 may include the Internet or other global network. The network 20 may be a local or wide area network. The network 20 may be a public or private network; it may be limited to the nodes in the system, or may include other nodes unrelated to the system.

The nodes 11-16 according to an embodiment of the present invention operate together as a single distributed system, but each node 11-16 can operate independently if it becomes disconnected from the system 1. According to an embodiment of the invention, when a disconnected node reestablishes a connection to the system 1, data, operations and communications are synchronized with other nodes on the system 1.

As discussed in greater detail below, the nodes operate in a grid type communication system. Each node may communicate, in a peer-to-peer relationship, with any of the other nodes in the system. The communications are independent of any central control for the organization. The nodes with which a specific node will communicate is defined individually within each node in accordance with its operation. The rules within a node control the communication of messages, and related data, to different nodes. Communications can designate a specific node, or set of nodes, and specific applications operating on each of those nodes. The communication structure of the system 1 as a whole is not centrally controlled; it is determined by the conglomeration of the individual communications set within all of the nodes.

The present invention allows the system to operate as a cohesive unit with processes and data distributed throughout the nodes. This is achieved through the use of distributed workflow and coordination of data. Each node operates independently, but the communications generated by each node provide proper synchronization, distribution and control of data. As discussed below, this is achieved by the operation of a core within each node. The core in the node includes a set of rules which define the workflow for that node. Communications between nodes are controlled through messages generated by the core in each node. The rules include processes to perform upon receipt of specific types of messages from other nodes. The rules further include processes to generate messages and to route them to other nodes. The processes in all of the nodes operate together to create a cohesive workflow using communications of messages.

The distributed system of the present invention primarily relates to the synchronization and control of data used by applications at each node. The system of the present invention controls the data throughout the system. It generally does not perform the analysis of the data. Analysis of data is performed separately by other applications. The system of the present invention controls the data within a node and between nodes in the system. The rules within a node manage, maintain, and distribute data from applications. The nodes maintain the relationships between data within a node and across nodes in the system. The system, through the rules in each node, provides integration of data between different applications, whether on a single node or on different nodes.

Figure 2:
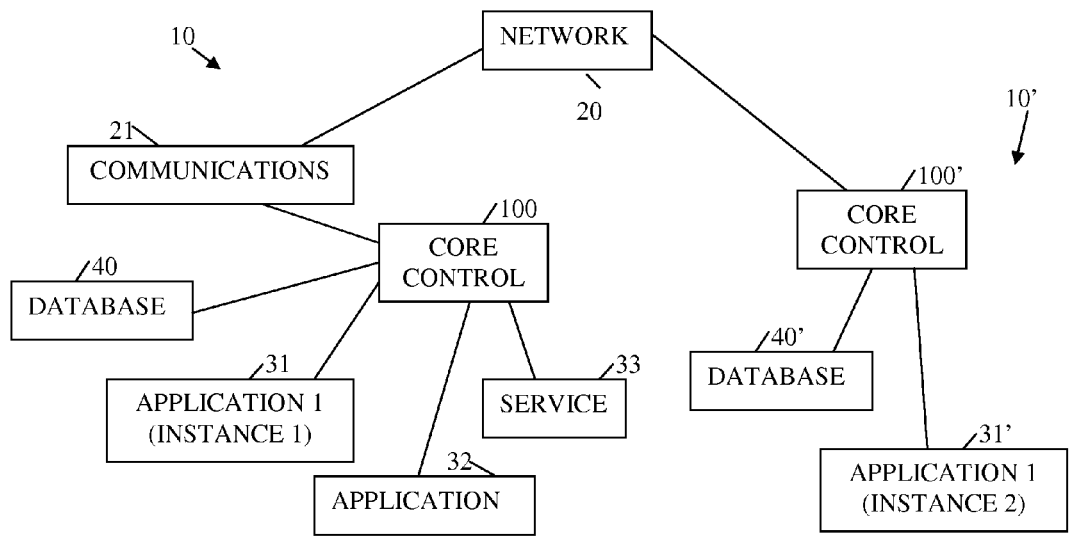
FIG. 2 is a block diagram illustrating node controller cores according to an embodiment of the present invention.

FIG. 2 illustrates a configuration of a node 10 according to an embodiment of the invention. The configuration shown in FIG. 2 is applicable to all of the nodes 11-17 on the system 1, regardless of the type of node. A node 10 includes a processor, memory and programming to provide the operation of the node. The node 10 may be a general purpose computer, a special purpose computer, or a simple processor. The node 10 includes programs, applications and features outside of those relating to operation of the node in the communications system of the present invention. FIG. 2 illustrates conceptually the components of the node 10 relating to the present invention. It does not include all of the hardware and software necessary for complete operation of all of the features of a node. Appropriate programming is stored in the memory of the node to provide for operation of the processor to achieve the components of the node as shown in FIG. 2 relating to the communication system of the present invention.

A node 10 includes a communications portion 21 connected to the network 20. The communications portion 21 provides the communications with other nodes on the network 20. The communications portion 21 includes both hardware and software necessary to provide the network connection and to transmit and receive information. The communications portion 21 may be a program or application which operates on the processor of the node to connect the node with other nodes in the system. The program or application may be separate from the communications subsystem of the core. The communications subsystem of the core determines the messages created and the nodes or other elements to receive them. The communications portion 21 provides the functionality to transmit the messages to the appropriate nodes or other elements.

The node 10 operates through a core control 100. The core control 100 provides all of the messaging and data control discussed below with respect to embodiments of the present invention. The core control 100 is connected to the communications portion 21 to communicate with other nodes in the communications system. The core control 100 controls and coordinates data and information between applications 31, 32, services 33, and databases 40 within the node 10. The applications 31, 32 and services 33 provide the operation of the node to achieve its objectives. The database 40 (or multiple databases) store data necessary for operation of the applications 31, 32 and services 33. The database 40 (or multiple databases) may also store data necessary for operation of the node 10 and/or core control 100. For example, routing information about other nodes, rules for operation of the node, communication trails, synchronization information and any other information used in operation of the node may be stored in a database 40. Furthermore, as used herein, the database 40 includes any type of mechanism for storing data and information utilized by the node or any of the applications on the node. The data and information need not be configured as a database. The core control 100 operates to control the interactions between applications 31, 32, services 33, databases 40 and those of other nodes on the system. Thus, the core control 100 may operate with any type of application, service and database.

FIG. 2 further illustrates a second node 10' having a communications portion 21', a core control 100', an application 31', and a database 40'. Of course, the second node 10' may have all of the same components as the first node 10. In an embodiment of the invention, a single application (Application 1 31, 31') is running with respect to each of the two nodes. The application may be stored on the device at the node, or may be operated from a remote location. Thus, Application 1 may be the same software at two locations or two instances of the same software operating at the two locations. The data for Application 1 31, 31' is stored locally at each node, i.e. in the respective databases 40, 40' through the core control 100, 100'. If data is added, deleted or changed by Application 1 31 at the first node 10, the core control 100, in addition to storing the data in the database 40, communicates the data, through the communication section 21, network 20 and communications portion 21', to the core control 100' at the second node 10'. The control control 100' at the second node modifies the same data in the database. The process also works the same way in reverse with respect to data added, deleted, or changed by Application 1 31' in the second node 10'. Through such operations, each node retains locally the data necessary for its workflow and applications and the data is synchronized across the entire system.

Figure 3:
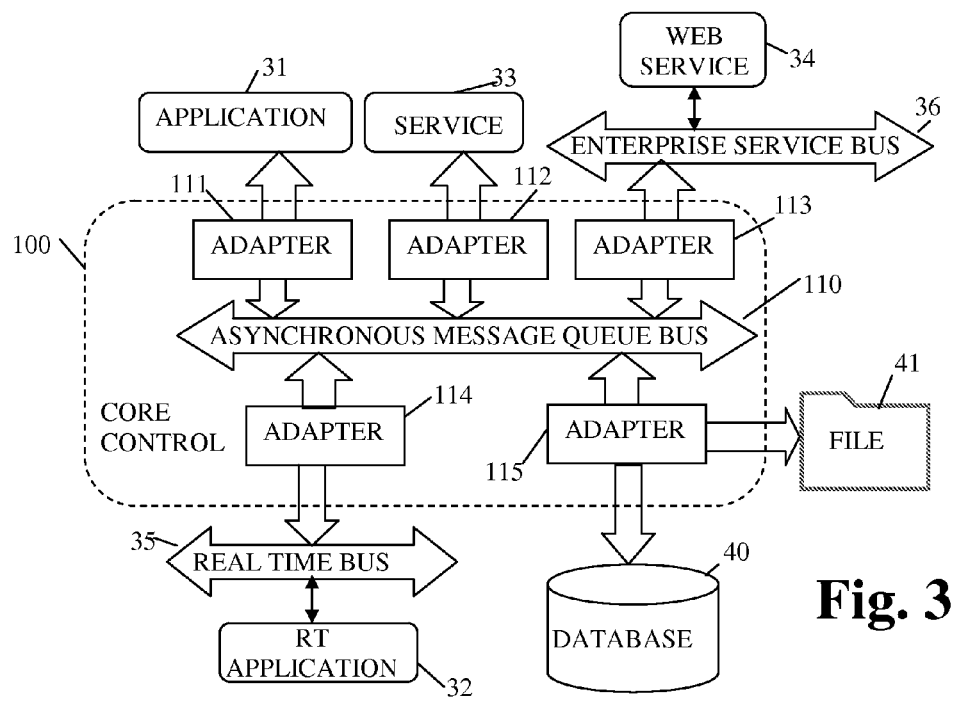
FIG. 3 is a block diagram illustrating a node controller core according to an embodiment of the present invention.

The basic structure of the core control 100 is illustrated in FIG. 3. The core control 100 operates as a communication conduit between the applications, services and databases. It provides messaging between applications and controls the input and output of data from the databases to the applications. FIG. 3 does not explicitly show the communications portion 21 of the node 10. As stated previously, the communications portion 21 may function as an application within the node 10. Thus, the communications portion 21, which allows communications with other nodes in the system, is treated as any other application 31 with the structure shown in FIG. 3.

The principal elements of the core control 100 are a message queue bus 110 and a plurality of adapters 111-115 connected to the message queue bus. The message queue bus 110 has a defined structure for messages, data and information. The operation of the core control 100 in managing the message queue bus 110 and connecting applications, services and databases together, as discussed below, is independent of the structure of messages, data and information. Preferably, it is an XML structure. However, any other defined structure can be used in connection with the invention. The message queue bus 110 receives and transmits messages and controls the transmissions between applications, services and databases.

The control core 100 is able to operate with a large variety of applications, services and databases through the use of the adapters 111-115. As is typical, applications, services and databases have different defined structures for communications. To create compatibility, and the ability to communicate information and data between different applications, services and databases, at least one of the communicating programs requires a translator or adapter to convert one structure to another. In conventional systems, the need for multiple translators and adapters hinders interoperability and increases the sizes of programs. In order to design a database to function with multiple applications, multiple translators or adapters are required. The same would be true of a second, different database. Communicating the information over a network, which requires its own structures, adds further complexity. The core control 100 of the present invention resolves these problems by providing the translation function in a single communications mechanisms between all of the applications, services and databases. All incoming messages, information and data are translated into the defined structure of the message queue bus 110. Then, all outgoing messages are translated from the structure of the message queue bus 110 to the native structure of the application, service or database receiving the message. The translation function is achieved through the use of adapters 111-115. Each adapter 111-115 operates to connect the message queue bus 110 to an application, service or database having a specific structure outside of the core control 100. An adapter 111-115 is needed for any application, service or database which is to operate within the system of the present invention. Thus, all interactions between outside structures occur through the core control 100. Since all control of messaging and communications occurs through the message queue bus 110, the addition of applications, services and databases is simplified. All that is required is creation of a new adapter to translate between the new application, service or database and the defined structure of the message queue bus 110.

As illustrated in FIG. 3, the communications system of the present invention can operate with a large variety of applications, services and databases. In some cases, the core control 100 may connect directly to an application 31 or service 33 operating on the same processor as the core control 100. The adapters 111, 112 provide the translations necessary to communicate with these applications 31 and services 32. Similarly, the core control 100 may connect directly to a database 40 or file 41 stored in the memory operating with the same processor as the core control 100. Again, all that is required is a proper adapter 115. FIG. 3 illustrates a single adapter 115 for a database 40 or file 41. Of course, the core control 100 may require a different adapter for each database 40 or file 41 if their native structures are different.

Finally, the core control 100 can operate with other types of applications or services which are remote from the processor of the core control 100. To do so, the messages, information and data are transferred to a separate bus 35, 36 providing communications with a remote application or service. FIG. 3 illustrates communications between the core control 100 and a real time application 32 through a real time bus 35 and to a web service 34 through an enterprise service bus 36. These are just exemplary of remote applications and services and their respective busses. The adapters 113, 114 may translate messages, information and data to a structure for the remote application 32 or service 34, or may merely translate to a structure for communications on the respective bus 35, 36. Additionally, if translation is required to the structure of the remote application or service, multiple adapters may be connected to a single bus to provide translations for different remote applications or services. Furthermore, the term "bus" to communicate with remote applications is used broadly to include any connection. It is not limited to a single bus nor to a direct connection between the core control 100 and a remote application or service. Thus, the core control 100 can provide communications with applications and services connected through any type of network, including a local area network, wide area network and/or global network. Similarly, databases or files for storing information and data do not have to communicate directly to the core control 100. Additional communication structures, including a network, can be positioned between the database or file and the core control 100.

FIG. 3 illustrates the core control 100 as having a message queue bus 110 and a plurality of adapters 111-115 for providing translations. While the core control 100 may be constructed in this manner, the described structure is conceptual rather than physical. The functionality of the adapters 111-115 may be integrated into control of the message queue bus 110, rather than operating as a completely separate process. The objective is to provide control of the communications between disparate applications, services and databases through the core control 100. Thus, the core control 100 can control the nature of the communications.

Figure 4:
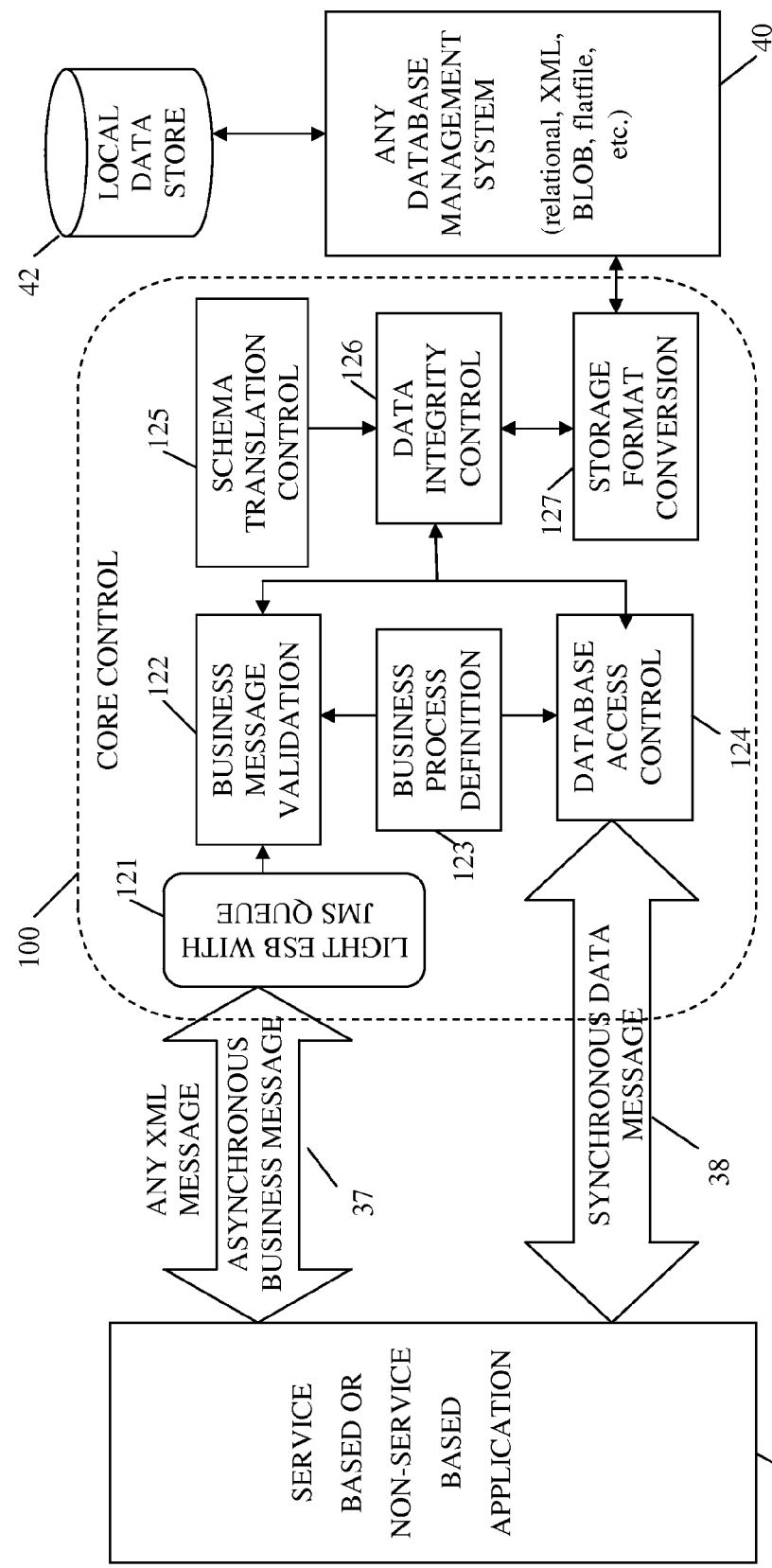
FIG. 4 is a block diagram illustrating a node controller core according to an embodiment of the present invention.

The core control 100 provides communications between applications, services, and databases through a message queue bus 110. However, the message queue bus 110 is more than just a conduit for messages between adapters 111-115. The core control 100 provides control of the communication process and thus the entire communication system 1 through the operation of the message queue bus 110. FIG. 4 illustrates the processes used by the core control 100 in the communications process between applications. Any application or service (collectively 31) sends and receives messages through the communication system 1. As noted in FIG. 4, messages may have two types synchronous 37 and asynchronous 38. FIG. 4 illustrates these messages as separate communications, possibly over different buses, to different parts of the core control 100. This is not required. The structure of the message may identify its nature. Each type of message is processed differently. When a message is received by the core control 100 it will determine the type and process the message appropriately. This can be done through different physical structures or through different processing within the core control. Similarly, when messages are to be sent by the core control 100, they are processed according to the type of message to be sent.

A synchronous message is processed through database access control 124. The database access control 124 provides a conduit to the database or other storage mechanism. A message may seek to store or retrieve data from the database. The database access control 124 controls the flow of data in synchronous messages. The flow of the synchronous message is determined by the business process definition 123. The business process definition 123 allows setting of information for determining the nature of a message and the appropriate process for handling that message. To accept additional types of messages in the core control 100, only the business process definition 123 needs to be changed to allow for proper handling of the message.

The core control 100 includes a storage format conversion 127, which functions as the adapter 115, to a database. The storage format conversion 127 ensures that the data to be stored in the database is of the proper structure for that database. If necessary, the structure is changed to provide the proper format. An application or service 31 may send a synchronous message having data in the proper format. In this case, the database access control 124 merely passes the data through the storage format control 127 to the database without any processing. The data is stored in the database. Similarly, data retrieved from the database passes through the storage format control 127 and databases access control 124 and is converted to the proper format for the requesting application or service. As illustrated in FIG. 4, the database may include a database management system 40 and a separate physical memory 42. Alternatively, the core control 100 may provide direct access to the physical memory. The storage format control 127 can provide the necessary operations to store and retrieve information directly from physical memory 42.

In addition to changing the structural format of data for storage and retrieval from a database, the core control 100 monitors the data to ensure its integrity. Based upon defined schema 125, the data integrity control 126 reviews all incoming and outgoing data to verify its structure and content.

Asynchronous messages 37 are communications between applications or services 31. These messages are sent to the core control 100 where they are processed before being transmitted to the recipient application or service. Asynchronous messages 37 are received in the core control 100 through a message service function 121. The message service function 121 may include an enterprise service bus (ESB) with queue control. Queue control may be provided by a Java Message Service (JMS) or by any other public or private process. The message service function 121 provides for the orderly processing of asynchronous messages within the core control 100. Each message proceeds to business message validation 122. Business message validation 122 is used to verify the structure and content of the message. The message is processed within the business message validation 122 through the definitions within the business process definition 123. The core control 100 may verify the source and recipient of the message and the ownership of the message. This verification may include security checking to prevent hacking of the system and possible corruption of data. It also ensures data integrity. As with synchronous data messages, business messages are also checked for integrity in the data integrity control 126. The structure of the message is verified. Its structure may also be altered for to a format for the recipient application. Structures are determined based upon schema translation definition 125 for the relevant applications. Once a message has been verified, it is sent to the appropriate recipient application or service.

Part of the business process definition 123 is information relating to applications for sending and receiving messages. The operation of each node 10 is determined by an overall workflow, or set of workflows, within the system 1. An overall workflow within the system is separated into parts and distributed among the nodes. Of course, portions of the workflow may be duplicated within multiple nodes. The portion of the workflow applicable to a node is included within the rules of the node and within the business process definition 123. The business process definition 123 includes information about other nodes on the communication system 1 with which the applications of a specific node are to communicate to achieve the workflow. In this manner, the business process definition 123 creates the grid-type communication system of the present invention. Each core controller 100 in a node is programmed, through the rules, with information relating to the other relevant nodes and how to transmit messages to those nodes through the network. The business process definition may further include identification of nodes and/or specific messages in the network which are valid or authorized at the specific node with which the core control 100 is associated in accordance with the workflow. Thus, the core control 100 provides proper control of intra-node communications within the network.

The use of a business process definition 123 within each node to form the grid-type communication system creates a robust and dynamic system. In particular, the distributed nature of workflow processes and node communications allows dynamic modifications of configurations during continuous operation of the system. As discussed in greater detail below, if a communication disruption occurs with a specific node, data and information can be synchronized once a connection is reestablished. Furthermore, if a change occurs with a specific node, all processes will continue without loss of data, information, or processes. For example, an IP address for a node can change. This may occur if the node is moved to a new location, if the address changes due to dynamic IP address assignments for the node, or if the node is replaced with a new node. The rules within the node account for such occurrences. Information about the new IP address is sent in a message to each node with which the changed node communicates in accordance with workflows. Each node which receives the information processes the message and stores the new IP address in connection with that node. All further communications with the node are routed to the correct IP address. Synchronization can be used to ensure that no messages or data were lost subsequent to the IP address change. Similarly, any other types of changes to the communication processes for a node are easily distributed to the relevant nodes throughout the system.

According to an embodiment of the invention, the core control 100 maintains a small footprint. The size of the core control 100 is dependent upon the number of rules utilized therein. In order reduce the footprint of the core control 100, the core control may periodically eliminate rules from its repository. Purging of rules and/or other information is based upon the workflow for the system as a whole. The core control 100 in each node includes information about the workflow of the business and the relationship of the particular node to that workflow. In the event that space becomes limited, less important rules and information, as judged by their priority to the workflow, can be deleted to allow more space for those of higher importance. The selection of information to remove is also controlled by the rules in the core control 100.

Figure 5:
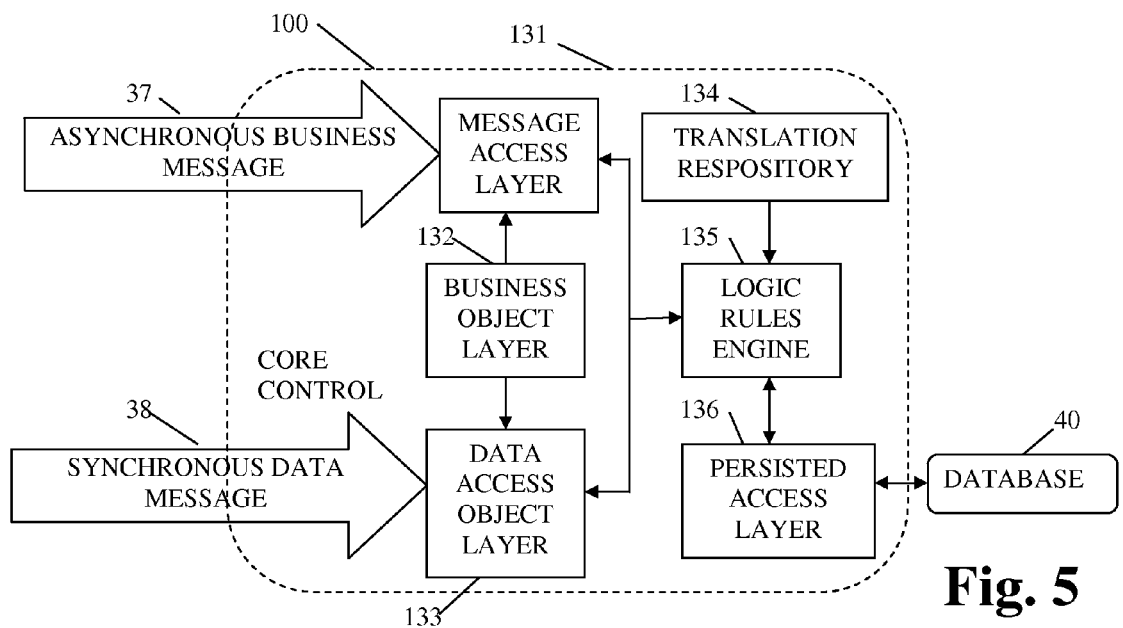
FIG. 5 is a block diagram illustrating a node controller core according to an embodiment of the present invention.

FIG. 4 illustrates conceptually the operation of the core control 100 and the processing of different types of messages. FIG. 5 is a similar diagram illustrating the technical operations of the core control 100 according to an embodiment to the present invention. Of course, the functionality of the core control 100 in processing of messages may be done in other manners within the principles of the invention.

FIG. 5 illustrates the relationship between a message access layer 131, a business object layer 132, a data access object layer 133 and a persisted access layer 136, as those layers are understood within typical software programming and computer communications.

The business object layer 132 provides definitions of message structures for use within the core control 100. The message structures identify the message and the processing required. Message structures may be of any known type. For example, messages may be formatted as business object documents (BOD) from the Open Applications Group Integration Specification (OAGIS) or other body. The messages may be formatted according to a general or specific XML Schema Document (XSD). Multiple types of message may be accommodated within the core control 100 through definition in the business object layer 132. Each message is reviewed to determine that it meets a known format in the business object layer 132. Once the format is known, the message can be processed in accordance with the appropriate definition.

The persisted access layer 136 synchronizes data between the core control 100 and any databases or other storage. It may provide functionality for a Java Database Connectivity (JDBC), relational database management system (RDBMS), or other database structure. The persisted access layer may use a general structure applicable to multiple databases, or may use proprietary structures, as necessary to communicate with the necessary databases.

When a synchronous data message 38 is received, its type is determined through the business object layer 132 and it is processed by the data access object layer 133. The data access object layer 133 provides access for the data in the message with the persisted access layer 136. For messages providing data for storage, the data is provided to the persisted access layer 136. The persisted access layer 136 converts the data to the appropriate format and transfers it to the database. For messages requesting data, the data access object layer 133 requests the data from the persisted access layer 136. The persisted access layer 136 retrieves the information from the database and converts the format of the information from the database structure to a structure to be transmitted in a message to the requesting application. The formatted data is transmitted by the data access object layer 133 through a synchronous message 38 to the requesting application.

When an asynchronous business message 37 is received, its type is determined through the business object layer 132 and it is processed by the message access layer 131. The message access layer 131 may include data ownership management (not shown). The data ownership management manages and prioritizes data and relationships to various systems and databases. The ownership of a message and related data is verified by the message access layer 131 as part of the processing. Ownership validation ensures integrity of the data and the communications. Business messages 37 also proceed to the persisted access layer 136. The persisted access layer 136 maintains the message information for communication with another application. The message may be directly sent by the core control 100 or may be stored for retrieval by an application, as appropriate for the type of message.

All messages, whether synchronous data messages 38 or asynchronous business messages 37, proceed from the respective data access object layer 133 or message access layer 131 to a logic rules engine 135. The logic rules engine 135 controls the processing of messages. It provides the transformations of data for its communications to or from databases and to or from various applications. The logic rules engine 135 is connected to a translation repository 134. The translation repository provides the information necessary for the logic rules engine 135 to transform data between the persisted access layer 136 and the formats to and from the respective applications. The logic rules engine 135 further includes business rules relating to operation of the core control 100 and communications between nodes.

The business rules in the logic rules engine 135 can provide the operation of the core control 100 according to embodiments of the present invention. Through defining appropriate rules, the core control 100 can determine nodes on the network to which messages are to be sent and from which messages may be received. The rules control the communication of messages between applications at a single node and across nodes.

Similarly, the rules in the logic rules engine 135 controls the storage of data, either at a single node or across nodes. The use of the structure of the core control 100, including the logic rules engine 135, allows for proper storage and synchronization of data within the grid type communication network. Data can be stored locally and/or transmitted and received from other nodes within the communication system 1. Preferably, all data necessary for ordinary operation of a node is stored locally, whether or not it is also stored elsewhere. If communications with the network is lost, the node and all applications running thereon, may continue to operate with the locally stored data. At least key functionality is maintained.

The logic rules engine 135 includes audit information regarding data which has changed. This simplifies synchronization of data across nodes using the same data. Once communications are reestablished with the communication system 1, the core control 100 sends messages to other nodes with which the node communicates as part of the workflow requesting any changes to data which occurred during the communication disruption. Similarly, the core control 100 sends any data it has changed during the disruption to the relevant nodes according to the workflow. This provides for rapid synchronization of data upon reestablishing communications. Since a node seeks data from different nodes, synchronization is not delayed through accessing all data from a single node, particularly if multiple nodes are seeking the data simultaneously.

The logic rules engine 135 also includes information relating to the overall workflow of the system in addition to the workflow applicable to the single node. The logic rules engine 135 may adjust the processing order of rules so that processes are ordered according to priorities of the system as a whole.

Rules can be programmed in the logic rules engine 135 for a node upon initialization of the core control 100 at that node. Also, since the rules are stored and accessed by the logic rules engine 135, rules can be added, deleted or changed through transmission as messages. This allows individualized control of node operation from the organization control 16, dispatch control 15 or any other subpart. The ownership information for messages can determine the identity of the sender and whether rule changes requested by a message are authorized. Once a rule is changed, added or removed, the logic rules engine 135, and thus the node, operates with the new rules, without disruption. Each node can be reprogrammed on the fly through changing rules while a node is still operating. Updates and changes to a node can occur without downtime for the system.

Figure 6:
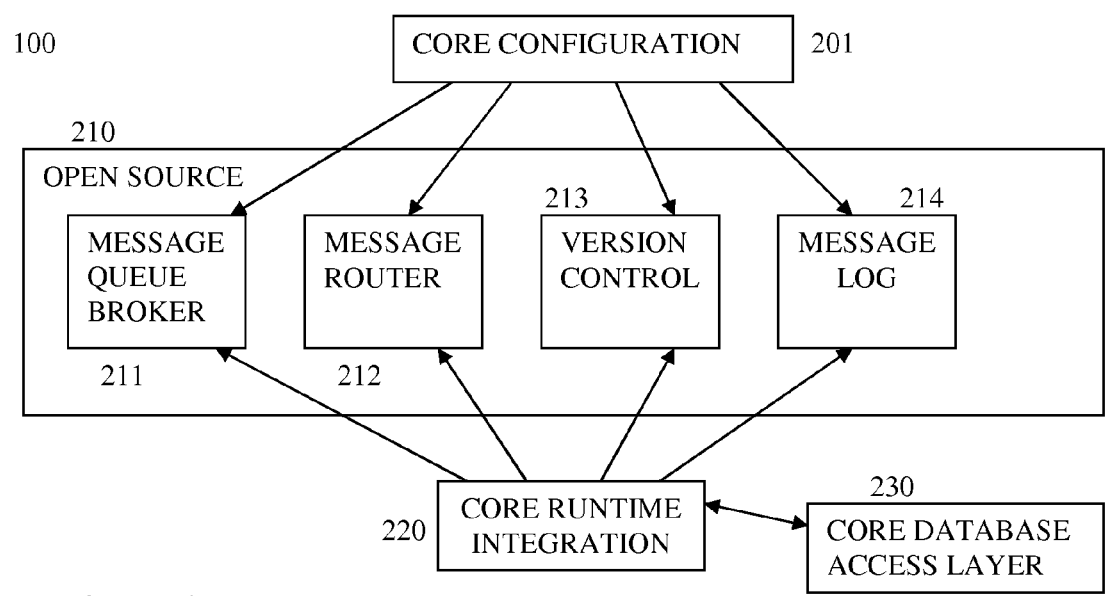
FIG. 6 is a block diagram of a programming structure according to an embodiment of the present invention.

The design of the core control of the present invention allows ease of programming through the use of individual components, many of which are available as open source software. FIG. 6 illustrates a programming structure according to an embodiment of the present invention. Several open source software programs 210 can provide functionality necessary for operation of the core control 100 of the present invention. Functionality can be provided by software for message queue brokering 211, such as is available from ActiveMQ as a JMS message queue broker; message routing, such as is available from Apache CAMEL, a business process message router; version control, such as is available from MAVEN; and message logging, such as is available from SEDNA. Of course, other open source software could be used for any of this functionality. Furthermore, open source software may be used for other functionality, or specific programming may provide any of the functionality. In order to accommodate open source software, the core control 100 would be programmed to provide a configuration 201 utilized to set up the open source software components. A separate portion of the core control 100 is provided by runtime integration 220 which accesses the open source software components which have been properly configured. The runtime integration 220 provides for the processing of messages and interaction with the databases 230. The open source software allows for maintaining the initial processing of messages, control of flow, and auditing capabilities.

Having disclosed at least one embodiment of the present invention, various adaptations, modifications, additions, and improvements will be readily apparent to those of ordinary skill in the art. Such adaptations, modifications, additions and improvements are considered part of the invention.

The invention claimed is:

1. A distributed workflow processing system comprising a plurality of independent peer nodes connected together in a peer-to-peer network, each node performing a particular workflow processing operation that is a portion of a distributed workflow process, comprising:

a first peer node having a first processor executing a first workflow processing operation that is a portion of said workflow process, said first workflow processing operation being defined by first rules at the first peer node that control the first processor of the first peer node independently of other peer nodes and without the necessity of a central network controller to cause the first peer node to perform said first workflow processing operation;

a first data store of said first peer node storing said first rules defining said first workflow processing operation and storing first data of said first workflow processing operation;

a second peer node having a second data store and having a second processor performing a second workflow processing operation that is another portion of said workflow process, said second workflow processing operation being defined by second rules stored at said second peer node that control the second processor;

a first communications subsystem of said first peer node controlled by said first processor and said first rules for communicating messages and said first data from said first peer node to said second peer node; and wherein said messages are formed and communicated in accordance with the first rules and under the control of said first processor from said first peer node to said second peer node to change the second rules and the second workflow processing operation at said second peer node to change the distributed workflow process.

2. The distributed workflow processing system of claim 1, wherein the first rules control the first processor of the first peer node to configure said messages communicated to said second peer node based upon said first workflow processing operation to change said second rules at said second peer node to change said second workflow processing operation.

3. The distributed workflow processing system of claim 1, wherein the first peer node comprises a plurality of different processing applications and services, and comprises a plurality of adapters for converting a first format of said first data of said first peer node to a second format appropriate for said second peer node.

4. The distributed workflow processing system of claim 3, wherein the first rules control the adapters to translate said messages from said first peer node to an appropriate format for said second peer node.

5. The distributed workflow processing system of claim 1, wherein said first rules control the first processor of said first peer node to validate and synchronize said data communicated from said first peer node to said second peer node.

6. The distributed workflow processing system of claim 1, wherein said first data store stores information about said first workflow processing operation for a time period during which said first communications subsystem is unable to communicate with said second peer node, and, upon communications with said second peer node being reestablished, said first processor is formed to communicate data that was modified during said time period to said second peer node.

7. A distributed workflow process in a system comprising a plurality of independent peer nodes connected by a peer-to-peer network, each peer node performing a particular workflow processing operation that is a portion of said distributed workflow process, the process comprising:

executing on a first processor at a first peer node of said network a first workflow processing operation that is a portion of said distributed workflow process, the first workflow processing operation being defined by first rules that control the first processor of said first peer node independently of other peer nodes and without the necessity of a central network controller to cause said first peer node to perform said first workflow processing operation;

storing at said first peer node said first rules defining said first workflow processing operation and storing first data of said first workflow processing operation;

communicating under control of said first processor messages and said first data of said first workflow processing operation from said first peer node to a second peer node, said second peer node having a second processor performing a second workflow processing operation that is another portion of said distributed workflow process, said second workflow processing operation being defined by second rules at said second peer node that control said second processor; and wherein said messages are formed and communicated in accordance with the first rules and under the control of said first processor from said first peer node to said second peer node to change the second rules and the second workflow processing operation at said second peer node to change the distributed workflow process.

8. The distributed workflow process of claim 7, wherein said first rules control the processor of said first peer node to configure said messages communicated to said second peer node based upon said first workflow processing operation to change said second rules at said second peer node to change said second workflow processing operation.

9. The distributed workflow process of claim 7, wherein said first peer node executes a plurality of different processing applications and services, and the process further comprises converting a first format of said first data of said first peer node to a second format appropriate for said second peer node.

10. The distributed workflow process of claim 9 further comprising translating messages from first peer node appropriate formats for said second peer node.

11. The distributed workflow process of claim 7 further comprising controlling said first processor at said first peer node with said first rules to validate and synchronize data and data formats for messages sent from said first peer node to said second peer node.

12. The distributed workflow process of claim 7, wherein the first rules control the first processor at said first peer node to perform operations required for said first workflow processing operation.

13. The distributed workflow process of claim 7 further comprising storing information about said first workflow processing operation for a time period during which communications with said second peer node were unavailable, and, upon said communications again becoming available, communicating data that was modified during said time period to said second peer node.

14. Non-transitory computer readable storage media for storing executable instructions for controlling a processor of a peer node in a peer-to-peer network of a plurality of peer nodes to perform a distributed workflow process, each peer node performing a particular workflow processing operation that is a portion of said distributed workflow process, comprising:

executing on a first processor at a first peer node of said network a first workflow processing operation that is a portion of said distributed workflow process, the first workflow process being defined by first rules that control the first processor of said first peer node independently of other peer nodes and without the necessity of a central network controller to cause said first peer node to perform said first workflow processing operation;

storing at said first peer node said first rules defining said first workflow processing and storing first data of said first workflow processing operation;

communicating under control of said first processor messages and said first data of said first workflow processing operation from said first peer node to a second peer node second, said second peer node having a second processor performing a second workflow processing operation that is another portion of said distributed workflow process, said second workflow processing operation being defined by second rules at said second peer node that control said second processor; and wherein said messages are formed and communicated, in accordance with the first rules and under the control of said first processor, from said first peer node to said second peer node to change the second rules and the second workflow processing operation at said second peer node to change the distributed workflow process.

15. The non-transitory computer readable storage media of claim 14, wherein said first peer node executes a plurality of different processing applications and services, and the process further comprises converting a first format for first data communicated from said first peer node to other formats appropriate for data for said second peer node.

16. The non-transitory computer readable storage media of claim 14 further comprising translating messages from said first peer node applications to appropriate formats for said second peer node.

17. The non-transitory computer readable storage media of claim 14 further comprising controlling said first processor at said first peer node with said first rules to validate and synchronize data and data formats for messages exchanged between said first peer node and said second peer node.

* * * * *